UNITED STATES PATENT OFFICE.

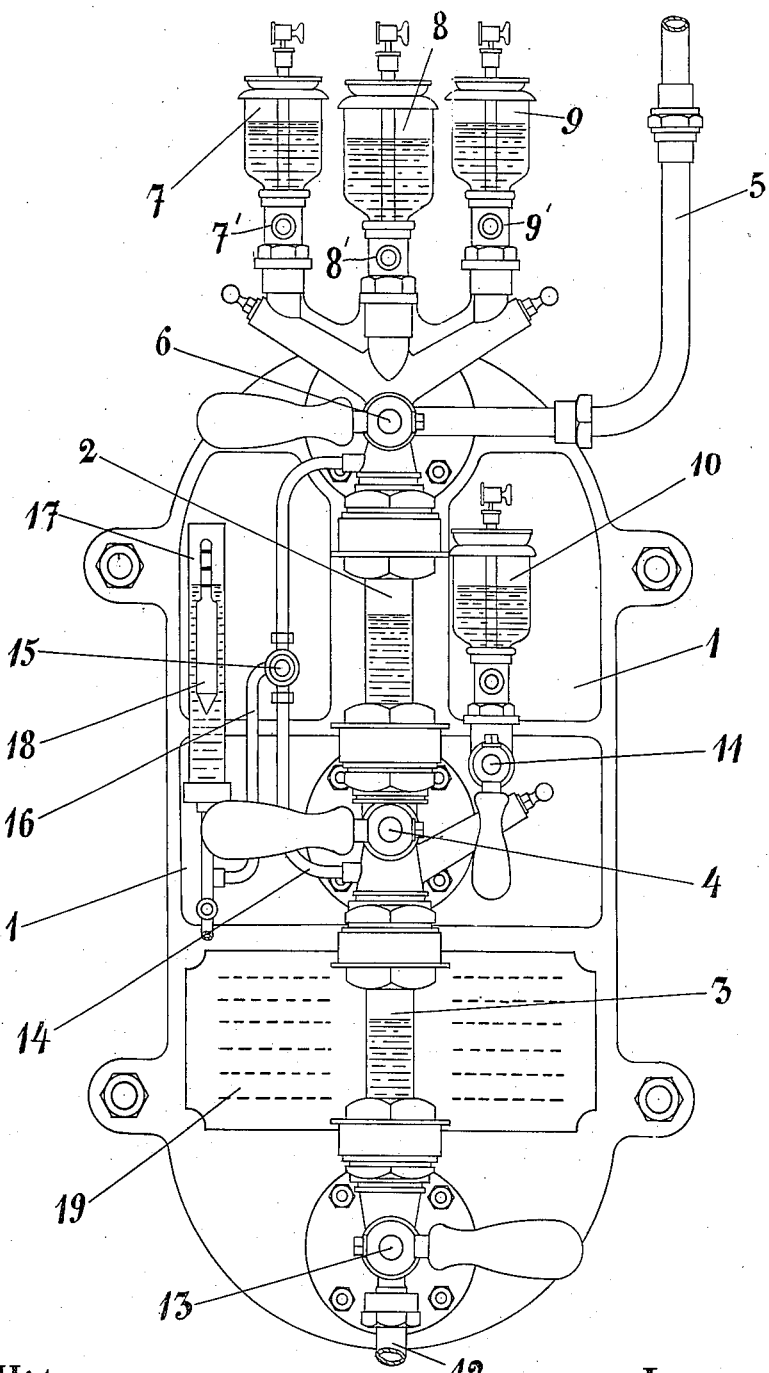

AUGUST SCHMITZ, OF AIX-LA-CHAPELLE, GERMANY.

APPARATUS FOR TESTING THE WATER OF A BOILER UNDER PRESSURE.

No. 862,870.　　　　　Specification of Letters Patent.　　　　Patented Aug. 6, 1907.

Application filed November 2, 1905. Serial No. 285,644.

*To all whom it may concern:*

Be it known that I, AUGUST SCHMITZ, a citizen of the German Empire, residing at Aix-la-Chapelle, State of Prussia, Germany, have invented an Apparatus for Testing the Water of a Boiler Under Pressure, of which the following is a complete specification, reference being had to the accompanying drawings.

Apparatus are already known which have for their object the determination by reagents of the quantities of soda lye or the like to be added to boiler water for the purpose of precipitating substances which form scale in the boiler. Such apparatus in general remove from the boiler a quantity of water, add to it the reagent fluid, and thereby is supposed to cause the larger or smaller supply of soda to be indicated in different degrees by the change of color. This method moreover depends upon the principle that when for instance, too little soda is present in the water the addition of the reagent should give a pink color, that in the case of sufficient soda in the water a red color should indicate this and that excess of soda should be indicated by a dark red color. But in this examination there is a large error which prevents the proper determination of the quantity of soda or the like. If, namely a boiler be supplied with soda, there accumulates from day to day a greater concentration of soda in the boiler water. During the first hours of the supply of the boiler with sufficient soda the color of reactions may be correct; if however the quantity of soda added be increased daily by that subsequently added, which cannot be removed from the boiler by evaporation but remains together with the precipitated salts of lime in the boiler, there will then occur a concentration of the soda and the above described test fails completely. A graduation of the red color does not occur any more, the color remains red and the boiler has according to circumstances either too little or too much soda. This method leads consequently to erroneous conclusions.

Recognizing the drawbacks of this very unsatisfactory and entirely erroneous test of the regular action of a boiler under operation and giving entirely wrong results, the present invention differs from it in that the water taken from the boiler under operation is first caused to react to a predetermined shade of color which is what would be produced if the water were sufficiently treated with soda, and then this reaction is again caused to return to the original color of the water simply by means of a color removing test. In this manner a thoroughly reliable result is obtained with relation to the recognition of the addition of soda, because precisely the latter reaction only occurs when in fact the boiler water has sufficient soda. In the case of an excess or deficiency of soda the removal of color occurs too late or too soon whereby it may be seen that the supply of the soda must be increased or diminished.

The accompanying drawing illustrates the new apparatus.

Upon the plate 1 are secured two glass cylinders 2 and 3 connected by a cock 4 between them. Through the tube 5 the water to be examined is drawn from the boiler under operation in the well known manner into the upper cylinder 2 through the three-way cock 6. Above this cock are placed the glass vessels 7, 8, 9 each being provided with an ordinary cock 7', 8', 9' respectively, so that by opening one or the other, the respective reagent can flow down and commingle with the boiler water in the glass 2. Below the connecting cock 4 is placed on one side the glass vessel 10 the connection whereof with the glass cylinder 3 is effected through the cock 11. The glass cylinder 3 possesses at its lower end the outlet pipe 12 with the cock 13. Connection between the three-way cock 6 and the cock 4 is effected through the tube 14 which is provided also with a three-way cock 15. From the latter the tube 16 branches off, the lower end whereof serves to support the glass cylinder 17. In this cylinder is placed the float 18. At both sides of the lower glass cylinder 3 is placed the plate 19. This device consists therefore of two glass cylinders or show glasses 2 and 3 connected together. In the first one there is produced a color reaction by the addition of a few drops of the test solution from one of the three vessels 7, 8, 9, which is intended to determine whether any, deficiency or excess, of soda or the like is present in the boiler water to prevent the formation of scale and corrosion. But this result as originally carried out is only certain under certain conditions. Therefore in the new apparatus this color reaction is tested for its reliability and this is effected as follows: The water colored by the aforesaid color reaction is allowed to run from the glass 2 through the cock 4 into the glass 3 and by opening the cock 11 a little of another test solution is added drop by drop to the reddened water as it is present in the glass 2 from the vessel 10. If now the discharge of the reddish color takes place after the addition of a certain number of drops from the vessel 10, then the color reaction in the glass 2 is proved to be correct. By the necessity of adding to the water in the glass 3 more or less drops from the vessel 10, the exact information is given whether the reaction in the glass 2 was correct. In the glass 3 is therefore by means of a color removing reaction in the opposite direction than the test in the glass 2, a proof whether any or a sufficiency or too much soda or the like is in the boiler and therefore the reaction in the glass 2 is specially verified. Consequently only in the combination of the color test with the color removing test the absolute certainty of the chemical control can be obtained.

The float 18 provided in this apparatus indicates by means of a series of marks placed upon it whether and how much soda and other matter has collected in the boiler water, strongly concentrating the same. The boiler water can easily be introduced through the cock 15 into the glass cylinder 17. If the selected mark of the float rises above the level of the water in the show glass 17, it indicates that the water in the boiler contains too much soluble matter which is apt to cover the walls with incrustations and the boiler should be blown out.

The new device therefore controls the working (a) by means of a color test; (b) by means of a color removing test; (c) by a float indicator of the amount of concentration.

Consequently by means of the combination of the two control systems independent of one another and which nevertheless mutually complete one another, and also by means of the float, the apparatus gives a three-fold assurance and thereby secures the most complete reliability of control of the working.

Having now particularly described and ascertained the nature of my said invention and in what manner the same is to be performed, I declare that what I claim is:—

Apparatus for testing boiler water while the boiler is operating comprising two test glasses 2 and 3 one above the other and connected by a cock 4, the upper being provided with a connection to the boiler to draw water and with means to add chemicals for color test, a glass vessel 10 for chemicals to remove the color in the lower test glass, being placed higher than test glass 3 and suitably connected therewith to admit said chemicals from vessel 10 drop by drop and a show cylinder with a float, suitably connected with the boiler to draw water therefrom, substantially as described.

In testimony of all which I have hereunto subscribed my name.

AUG. SCHMITZ.

Witnesses:
  HENRY QUADFLIEG,
  MATTHEW C. DILLINGHAM.